Dec. 11, 1962 P. J. NATHO 3,067,978
TOP ENTRY BALL VALVE
Filed Oct. 31, 1960 2 Sheets-Sheet 1

Paul J. Natho
INVENTOR.

BY Russell E. Schloff
ATTORNEY

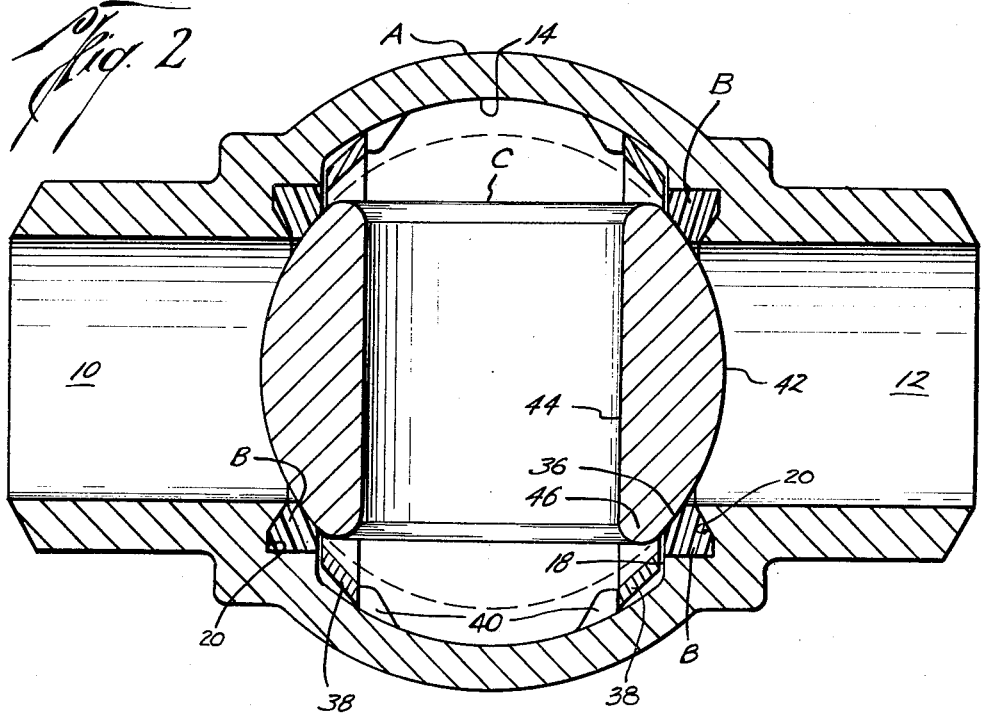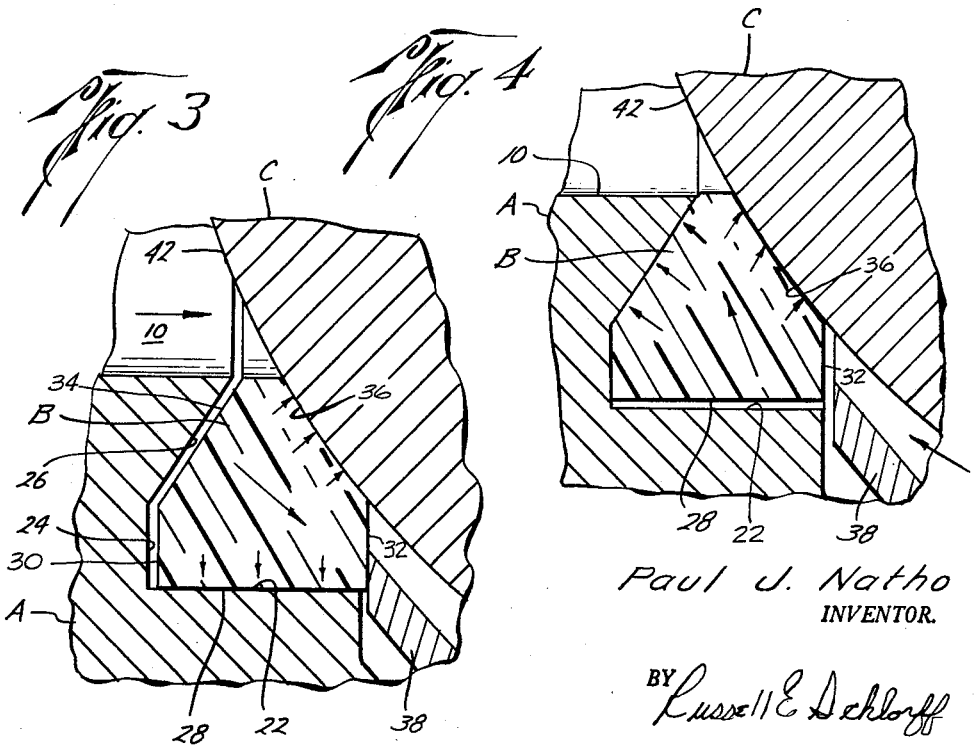

United States Patent Office 3,067,978
Patented Dec. 11, 1962

3,067,978
TOP ENTRY BALL VALVE
Paul J. Natho, Houston, Tex., assignor to ACF Industries, Incorporated, New York, N.Y., a corporation of New Jersey
Filed Oct. 31, 1960, Ser. No. 66,122
13 Claims. (Cl. 251—172)

This invention relates to spherical plug valves, commonly referred to as "ball valves," and more particularly to a top entry ball valve having a non-floating valve member and a resilient seat member under controlled restraint which seals by pressure actuation both upstream and downstream over the full pressure range of the valve.

Ball valves are quite old in the art. They are generally comprised of a valve body having a central valve chamber, a general spherical valve member positioned in the valve chamber, and one or two seat members between the valve member and the end of the valve chamber. The valve member has an internal passage which in the open position of the valve registers with the inlet and outlet ports to form the run of the valve, and a stem which projects through the body providing means to rotate the ball 90° between the open and closed positions. Originally, seat members for ball valves were formed of various rubber-like materials; however, with the improvement of the inert plastics—more particularly ethylene polymers containing fluorine—the trend has been toward utilization of such plastics. Various ball valves having rubber type seats have been of the top entry type, that is, there is an open top valve chamber and the ball and valve seats are inserted through this opening which is later closed by a bonnet. Top entry construction is beneficial in that it permits a renewing of the seats and valve member while the valve remains in the line. Moreover, the top entry type lends itself to a unitary body structure which can carry line strain much more efficiently than bodies having joints which are required to transmit line strain. Since the rubber-like material used in the seats could be relatively easily deformed, there was no great problem in compressing the seats and valve members together and inserting them as a unit into the valve chamber. However, the fluorocarbon plastics are generally rather hard and are not easily deformed and have presented a problem of assembly.

Most of the seals established in ball valves have been of the compression type. Each seat is compressed between the valve member and an end wall of the body to build up an internal force in the seat member which causes the seat member to maintain intimate contact with the spherical surface of the valve member and the end wall of the body, thereby establishing a seal between the body and the seat member and a seal between the valve member and the seat member. The compression provides not only the initial seal, but also the seal used for the normal functioning of the valve. Accordingly, should there be sufficient wear of the seat to decrease the initially built-in compression, the valve will leak. In order to overcome this disadvantage to a certain extent, many of the ball valves have a valve member which is free floating, that is, line pressure will force the valve member against the downstream seat. In such case, there is no upstream seal and the valve will not be suitable for block and bleed service or other services where an upstream seal is desirable. Also, both rubber and plastic have limitations as to internal strength, and accordingly valves using such materials have been generally limited to a low pressure range; for example in a 2" size to 300# and lower. One reason for this is that with a free floating ball the bearing load on the downstream seal increases as the line pressure increases and the various resilient materials used do not have sufficient internal strength to withstand the higher load developed by increased line pressure. As the size of the valve increases, this even becomes a greater problem because the unit load on the seat becomes greater. Another reason for the limitation in pressure rating is that as the valve rotates between positions an unsupported portion of the upstream seat is exposed to line pressure which tends to force the unsupported portion of the seat into the run of the valve where it can be cut by trailing edge of the passage in the valve member. This will take place even though the seats are not designed primarily for pressure actuation.

The ball valve of the present invention overcomes the above-mentioned shortcomings. It is of the top entry type having a unitary body provided with an open top chamber interposed between axially aligned inlet and outlet ports. The valve chamber has end walls which surround the inlet and outlet passages. The valve chamber is shorter in axial length through the axis of the passages than in transverse width. A seat pocket is formed in each end wall. The seat pocket is made up of an annular side wall coaxial with the passage, but of a greater diameter than the passage, and a diverging wall which intersects the passage and diverges axially outward of the valve chamber to intersect the annular wall. An annular seat member formed of resilient material is positioned in each seat pocket. Each seat member in cross section is of generally triangular configuration. The base of the triangle forms a cylindrical wall contacting the annular wall of the seat pocket. One angular wall lies adjacent the diverging wall of the pocket. The other angular wall extends into the valve chamber with a portion thereof forming the valve seat face. A rotatable valve member has generally spherical seating surfaces and an internal passage which in the open position of the valve registers with the inlet and outlet port to form the run of the valve. The valve member along the axis of the passage is shorter than along an axis through the spherical seating surfaces. This construction permits the valve member, when the passage is aligned with the inlet and outlet ports, to be inserted into the valve chamber. To controllably restrain the seat members, there are hollow frusto conical seat retainers which are placed over the passage ends of the valve and inserted with the valve member into the valve chamber. The frusto conical seat retainers are positioned between the seat members and seat retainer lugs in the wall of the chamber. While the seat retainers permit the seat members to move sufficiently to pressure act, they prevent them from moving into the run when unsupported whereby they could be cut during rotation of the valve member. The valve member is provided with a bearing which cooperates with a trunnion in the bottom wall of the chamber to journal the valve member in position. When the valve member is rotated to a closed position to contact the seats, a slight initial interference occurs between the seats and the spherical surface of the valve member. However, the seal does not depend solely on this initial interference. Line pressure from the upstream side will force the upstream seat into tight sealing contact with the surface of the ball and the annular wall of the pocket. The seat, ball and pocket are so arranged that a wedge is formed and the pressure forces the seat member toward the apex of the wedge. If the upstream seal leaks, line pressure will enter the valve chamber and cause the downstream seat member to similarly pressure act. This time the seat member will be forced into intimate sealing contact with the valve member and diverging wall of the seat pocket. Due to the construction, either seat will act as an upstream or downstream seat and flow can be in either direction. The seat retainers prevent the seat members from being extruded.

It is the principal object of the present invention to provide a top entry ball valve having a non-floating valve member and a resilient seat member under controlled restraint which provides a pressure actuated seal either upstream or downstream in the closed position over the entire pressure range of the valve.

It is an object to provide a top entry ball valve having a trunnioned valve member and a resilient seat member under controlled restraint in which the geometry of the seat member is such that the seat member is pressure actuated both upstream and downstream to form a seal for the valve.

It is another object to provide a top entry ball valve having a valve member provided with a generally spherical sealing surface in which the axial length of the valve member through the passage is shorter than the axial length through a spherical seating surface whereby the ball and seat retainer can be inserted into the chamber when the passage is aligned with the passage of the valve and upon rotation will contact and make sealing engagement contact with the seat member.

It is another object to provide a top entry ball valve having a non-floating valve member and a resilient seat retainer member which is so designed that the seat member is under controlled restraint and will not extrude during the time that a portion thereof is unsupported while the valve is being operated.

It is a more specific object to provide a top entry ball valve having pressure-actuated resilient seat members, and a valve member with spherical seating surfaces having a shorter axial length along the passage so that a frusto conical seat retainer can be positioned on either end of the passage and the assembly inserted between the seat members, the seat retainers controllably restraining movement of the seat members.

Other and further objects of the invention will be obvious upon and understanding of the illustrative embodiment about to be described, or will be indicated in the appended claims, and various advantages not referred to herein will occur to one skilled in the art upon the employment of the invention in practice.

A preferred embodiment of the invention has been chosen for the purpose of illustration and description and is shown in the accompanying drawings, forming a part of the specification, wherein:

FIG. 2 is a fragmentary sectional view of the valve shown in FIG. 1, taken generally along lines 2—2 of FIG. 1, the valve being in the closed position.

FIG. 3 is a fragmentary cross section in the region of the seat member illustrating the action of the seat member to upstream line pressure.

FIG. 4 is a view similar to FIG. 3 showing the action to downstream pressure.

Figure 1:
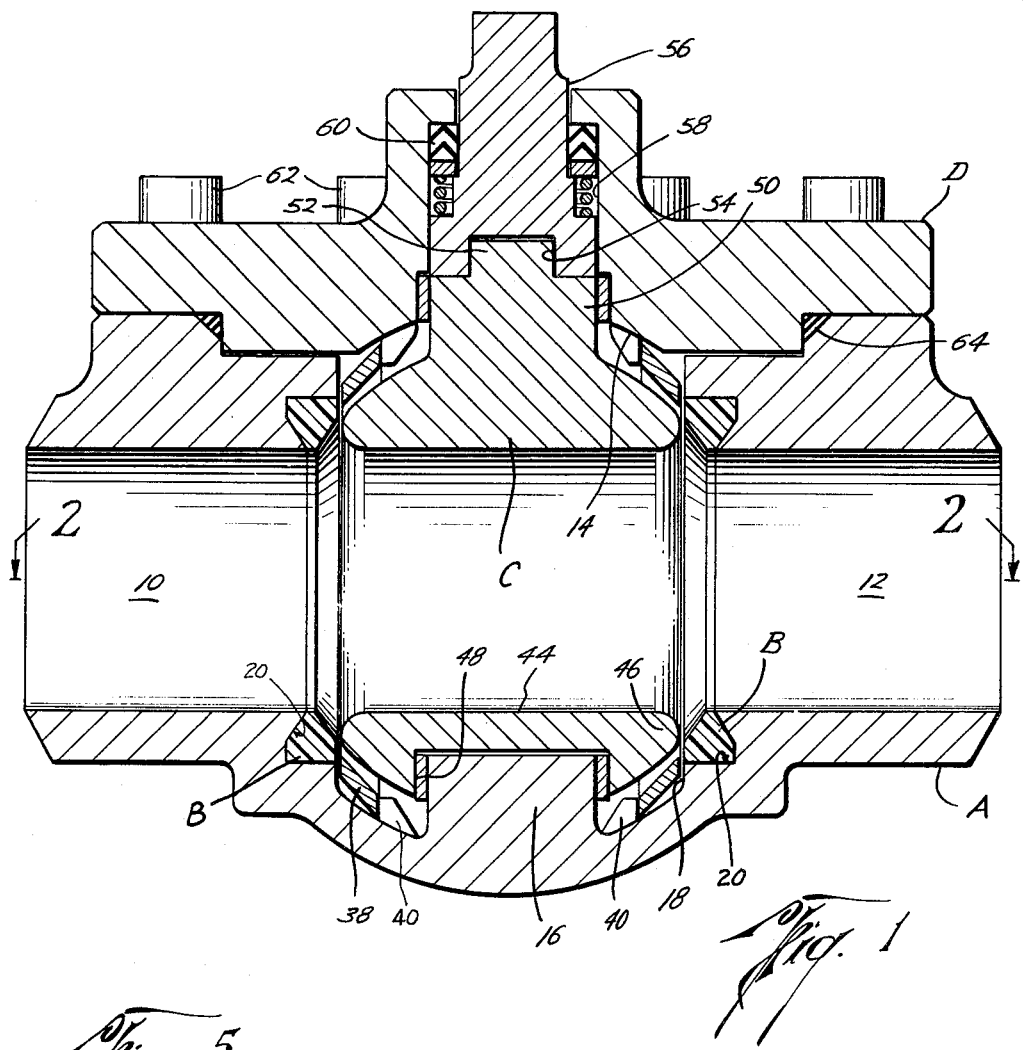
FIG. 1 is a central vertical section through a valve with the present invention, the valve being shown in the open position.
Figure 5:
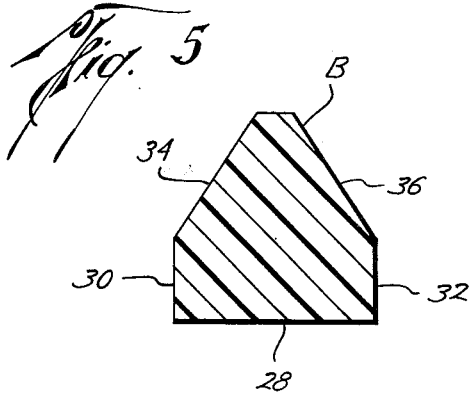
FIG. 5 is a cross sectional view of the seat member.

Referring now to the drawings, the valve is comprised generally of a valve body A, two seat members B—B, a spherical valve member C, and a bonnet D.

The valve body A has two axially aligned fluid passages 10 and 12 forming inlet and outlet ports respectively. The axial outer ends of the passages 10 and 12 are provided with means to attach the valve to a flow system as is well known in the art. Interposed between the two passages 10 and 12 is an open top valve chamber 14. A centrally located trunnion 16 forms part of the bottom wall of the chamber 14. The chamber has opposed end walls 18—18 which surround the passages 10 and 12. The distance between the end walls 18—18 is smaller than the distance between the side walls of the chamber 14. A seat pocket 20 is formed in each end wall 16. Each seat pocket 20 has an annular side wall 22 coaxial with the axis of the passage, but of a greater diameter than the passage.

Extending transversely from the axial outer end of the annular wall 22 is a rear wall 24. A diverging wall 26 intersects each passage and diverges axially outward of the valve chamber to intersect the rear wall 24. While the rear wall 24 is desirable, it is possible to extend the diverging wall 26 outward until it intersects the annular wall 22.

Positioned in the seat pocket 20 are resilient plastic seat members B—B. The seat members B—B are preferably formed of one of the ethylene polymers containing fluorine such as tetrafluorethylene which is commercially available under the trademark "Teflon." Each seat member B has a cross-sectional configuration defining a cylindrical wall 28, rear end wall 30, and front end wall 32, which extend perpendicularly from the ends of the cylindrical wall 28 and two converging angular walls 34 and 36. The cylindrical wall 28 is positioned against the annular side wall 22 of the seat pocket 20. The rear end wall 30 contacts the rear wall 24 of the seat pocket 20 and the front end wall 32 extends into the valve chamber 14. The rear angular wall 34 contacts the diverging wall 26 of the seat pock 20 and the front angular wall 36 forms the seat face for the seat member. Both seat members B—B are identical and can be used in either seat pocket of the valve. Each seat member B—B is retained in its seat pocket 20 by a hollow frusto conical seat retainer 38 which exerts controlled restraint on the seat member B. The small end of the seat retainer 38 is positioned against the front wall 32 of the seat member B. The large end of the seat retainer 38 is located adjacent a number of seat retainer lugs 40 which are cast in the walls of the valve chamber 14. Preferably there are three lugs 40 in the valve chamber 14. A fourth lug 40 is located on the inner wall of the bonnet D.

The rotatable valve member C is provided with generally spherical seating surfaces 42—42 and an internal passage 44 which when the valve is in the open position registers with the inlet and outlet ports 10 and 12 to form the run of the valve. The valve member C along the axis of the passage 44 is shorter than along an axis through the spherical seating surfaces 42—42 and is provided with the rounded nose portions 46—46.

The axial length of the ball through the passage 44 is approximately the same length as the distance between the end walls 18—18, which permits the ball when the passage 44 is aligned with the passages 10 and 12 to be inserted into the valve chamber 14. In this position, the rounded noses 46—46 do not quite make contact with the seat faces 36—36 of the seat members B—B. Each frusto conical seat retainer 38 has an internal diameter greater than the end portion of the valve member C. The seat retainers 38—38 are positioned over the nose portions 46—46 of the valve member C and are inserted into the valve chamber 14 with the valve member C. The bottom of the valve member C is provided with a bearing 48 which is journaled over the trunnion 16. The top of the valve member C may be provided with a cylindrical portion 50 which is journaled in a mating bearing in the bonnet D. Naturally, if desired, other means may be used to trunnion the valve member C to secure it against axial movement. The top of the valve member C is also provided with a projection 52 which cooperates with a keyway slot 54 in an operating stem 56. However, if desired, the operating stem may be made integral with the valve member C.

The bonnet D provides a cover for the open top valve chamber 14 with the inner wall of the bonnet D forming the top wall of the valve chamber 14. The bonnet is provided with an opening 58 through which the valve operating stem 56 extends. As is customary, packing means 60 is provided around the stem 56 to prevent leakage between the stem 56 and passage 58. The bonnet D may be secured to the top of the valve body A by utilization of bolts 62, and a gasket 64 may be used to prevent leakage between the body A and bonnet D.

Since a shortened ball is used, the spherical seating surfaces 46—46 will be slightly greater than the customary ratio of ball diameter to bore diameter. However, the overall space occupied by the ball of the valve member C will be smaller than if a completely spherical ball were utilized. By using the shortened ball valve member C, the valve can be assembled by the top entry method without any interference between the valve member C and the seat members B—B thereby eliminating damage to the seat members B—B during assembly. The frusto conical seat retainers 38 are such that they can be placed over the shortened end of the valve member C and inserted with the valve member into the valve chamber 14. If for any reason it is necessary to inspect the seat member B—B and valve member C, the valve member C and seat members B—B can be easily removed without damaging the seat members B—B. After they have been inspected, they can be replaced and reused.

As previously mentioned, the seat members B—B are pressure actuated and the geometry is such that each conical seat face 36 is tangential to its spherical surface 42 at a point of contact which is approximately 45° to the axis through the run of the valve. The seat members B—B and valve member C are so designed that there is a slight initial interference between the valve member C and seat members B—B when the valve is in a closed position. The interference may be in the neighborhood of .005 to .0015 of an inch. The seat member B, spherical seating surface 42 of the valve member C, and seat pocket 20 are so arranged that a wedge is formed therebetween and line pressure will force the seat member B toward the apex of the wedge. For example, on the upstream side the line pressure will flow between the diverging wall 26 of the seat pocket and angular wall 34 of the seat member B and force the seat face 36 into sealing contact with the spherical surface 42 of the valve member C. At the same time it will force the cylindrical wall 28 into sealing contact with the annular wall 22 of the seat pocket, see FIG. 3. The seat retainer 38 being adjacent to the front wall 32 of the seat member B will prevent the seat from being blown downstream and extruded. The seat retainer 38 also functions during the operation of the valve to prevent the unsupported portion of the upstream seat from being pushed out of its pocket during the time it is unsupported whereby it would be in the path of the opposite side of the passage which could shear it off. If the upstream seat member develops a leak, line pressure will flow into the chamber 14 and will contact the end face 32 of the downstream seat member B and flow between the cylindrical wall 28 and annular wall 22 of the seat pocket forcing the seat face 36 into sealing contact with the spherical surface 42 of the valve member C and forcing the rear annular face 26 of the downstream seat member B into sealing contact with the diverging wall 26 of the seat pocket 20, see FIG. 4. Accordingly, a seal is again established for the valve. The seat members B—B are so formed that they will seal upstream and downstream. Accordingly, flow may be from either direction. If an upstream seat should fail, the valve will still function since the downstream seat will properly function to tightly seal the valve. Further, the valve may be used for block and bleed service in the closed position since an upstream seal will be established at each end of the valve. Since the valve member C is trunnioned and the seat members B—B are preferably made from a fluorocarbon plastic, which has inherently low friction characteristics, the valve will be easy to operate. Further, each seat member is only subject to line pressure and is not subject to the compressive force as would be the case if the valve member were free to float against the downstream seat member.

As can be seen from the foregoing, the present invention, in one of its general aspects, is directed to the provision of a ball valve having resilient plastic seat members which are under controllable restraint from a seat retainer. The seat retainer prevents upstream line pressure from extruding the upstream seat. Moreover, the seat retainer affords support to the portion of the seat member which is unsupported during operation—that portion adjacent the passage of the valve member—and restrains it from flowing into the run of the valve where it could be sheared by the opposite side of the passage. The invention further provides a novel arrangement for a top entry ball valve which by having a shortened valve member and recessed seat members is easy to assemble without danger of damaging the seat members. The seat retainers are so designed that they may be placed over the nose of the valve member and inserted simultaneously with the valve member into the valve chamber.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What I claim is:

1. A top entry ball valve comprising a valve body having two axially aligned fluid passages forming inlet and outlet ports and an open-top valve chamber interposed between said passages, said chamber including side walls, a bottom wall having a centrally located trunnion and end walls surrounding said passages, the distance between the side walls being greater than the distance between the end walls, a seat pocket in each end wall, each pocket being formed of an annular side wall coaxial with the axis of the passages but of a greater diameter than the diameter of the passage, a rear wall transverse to the passage and a diverging wall intersecting the passage and diverging axially outward of the valve chamber to intersect the rear wall, an annular seat member formed of resilient plastic material positioned in each seat pocket, each seat member having a cross sectional configuration defining a cylindrical wall contacting the annular side wall of the seat pocket, rear and front end walls extending perpendicularly from the cylindrical wall, the rear end wall positioned against the rear wall of the seat pocket, the front end wall extending into the valve chamber, and rear and front angular walls extending from the rear and front end walls, the rear angular wall positioned against the diverging wall of the seat pocket and the front angular wall forming a seat face, a rotatable valve member having an internal passage which in the open position of the valve registers with the inlet and outlet ports to form the run of the valve and generally spherical seating surfaces, the valve member along the axis of the passage being shorter than the distance along an axis through the spherical seating surfaces permitting the valve member when the passage is aligned with the inlet and outlet ports to be inserted into the valve chamber and when rotated to a closed position to contact the seats in a sealing condition whereby there is a slight interference between the seats, a pair of hollow frusto conical seat retainers, one placed over each end of the passage of the valve member and inserted with the valve member into the valve chamber, a bonnet closing the valve chamber having an inner wall forming a top wall for the valve chamber, seat retainer lugs on the walls of the valve chamber and the inner wall of bonnet, the small end of the frusto conical seat retainer positioned adjacent the front end wall of the seat member, the large end of the frusto conical retainer positioned adjacent the seat retaining lugs permitting the seat member to move a controlled amount in response to line pressure to effect a seal but prohibiting movement into the run whereby it would be cut during operation of the valve, said valve member having a bearing, the bearing of the valve member journaled on the trunnion in the bottom wall of the chamber, the top of the valve member provided with a trunnion and the inner wall of the bonnet with a mating bearing receiving the trunnion of the valve member, the top of the valve member also provided with a projection, an operating stem, one end of said stem provided with a slot cooperating with the projection on the valve member, the bonnet having an opening through which the operating stem extends, and means establishing a seal between the operating stem and the opening in the bonnet.

2. A top entry ball valve comprising a valve body having two axially aligned fluid passages forming inlet and outlet ports and on open-top valve chamber interposed between said passages, said chamber including side walls, a bottom wall and end walls surrounding said passages, the distance between the side walls being greater than the distance between the end walls, a seat pocket in each end wall, each pocket being formed of an annular side wall coaxial with the axis of the passages but of a greater diameter than the diameter of the passage, a rear wall transverse to the passage and a diverging wall intersecting the passage and diverging axially outward of the valve chamber to intersect the rear wall, an annular seat member formed of resilient plastic material positioned in each seat pocket, each seat member having a cross sectional configuration defining a cylindrical wall contacting the annular side wall of the seat pocket, rear and front end wall extending perpendicularly from the cylindrical wall, the rear end wall positioned against the rear wall of the seat pocket, the front end wall extending into the valve chamber, and rear and front angular walls extending from the rear and front end walls, the rear angular wall positioned against the diverging wall of the seat pocket and the front angular wall forming a seat face, a rotatable valve member having an internal passage which in the open position of the valve registers with the inlet and outlet ports to form the run of the valve and generally spherical seating surfaces, the valve member along the axis of the passage being shorter than the distance along an axis through the spherical seating surfaces permitting the valve member when the passage is aligned with the inlet and outlet ports to be inserted into the valve chamber, a pair of hollow frusto conical seat retainers, one placed over each end of the passage of the valve member and inserted with the valve member into the valve chamber, a bonnet closing the valve chamber having an inner wall forming a top wall for the valve chamber, seat retainer lugs on the walls of the valve chamber and the inner wall of bonnet, the small end of the frusto conical seat retainer positioned adjacent the front end wall of the seat member, the large end of the frusto conical retainer positioned adjacent the seat retaining lugs permitting the seat member to move a controlled amount in response to line pressure to effect a seal but prohibiting movement into the run whereby it would be cut during operation of the valve, means securing the valve member against axial movement, an operating stem, one end of said stem cooperating with the valve member, the bonnet having an opening through which the operating stem extends, and means establishing a seal between the operating stem and the opening in the bonnet.

3. A top entry ball valve comprising a valve body having two axially aligned fluid passages forming inlet and outlet ports and an open-top valve chamber interposed between said passages, said chamber including a bottom wall, end walls surrounding said passages, a seat pocket in each end wall, each pocket being formed of an annular side wall coaxial with the axis of the passages but of a greater diameter than the diameter of the passage, a diverging wall intersecting the passage and diverging axially outward of the valve chamber to intersect the annular wall, an annular seat member formed of resilient plastic material positioned in each seat pocket, each seat member having a cross sectional configuration defining a cylindrical wall contacting the annular side wall of the seat pocket, rear and front end wall extending perpendicularly from the cylindrical wall, the rear end wall positioned adjacent the diverging wall of the seat pocket, the front end wall extending into the valve chamber, and rear and front angular walls extending from the rear and front end walls, the rear angular wall positioned against the diverging wall of the seat pocket and the front angular wall forming a seat face, a rotatable valve member having an internal passage which in the open position of the valve registers with the inlet and outlet ports to form the run of the valve and generally spherical seating surfaces, a pair of hollow frusto conical seat retainers, one placed over each end of the passage of the valve member and inserted with the valve member into the valve chamber, a bonnet closing the valve chamber having an inner wall forming a top wall for the valve chamber, seat retainer lugs on the walls of the valve chamber and the inner wall of bonnet, the small end of the frusto conical seat retainer positioned adjacent the front end wall of the seat member, the large end of the frusto conical retainer positioned adjacent the seat retaining lugs permitting the seat member to move a controlled amount in response to line pressure to effect a seal but prohibiting movement into the run whereby it would be cut during operation of the valve, means securing the valve member against axial movement, an operating stem having one end co-operating with the valve member, the bonnet having an opening through which the operating stem extends, and means establishing a seal between the operating stem and the opening in the bonnet.

4. A top entry ball valve comprising a valve body having two axially aligned fluid passages forming inlet and outlet ports and an open-top valve chamber interposed between said passages, said chamber including side walls, a bottom wall having a centrally located trunnion, end walls surrounding said passages, the distance between the side walls being greater than the distance between the end walls, a seat pocket in each end wall, each pocket being formed of an annular side wall coaxial with the axis of the passages but of a greater diameter than the diameter of the passage, a rear wall transverse to the passage and a diverging wall intersecting the passage and diverging axially outward of the valve chamber to intersect the rear wall, an annular seat member formed of resilient plastic material positioned in each seat pocket, each seat member having a cross sectional configuration defining a cylindrical wall contacting the annular side wall of the seat pocket, rear and front end wall extending perpendicularly from the cylindrical wall, the rear end wall positioned against the rear wall of the seat pocket, the front end wall extending into the valve chamber, and rear and front angular walls extending from the rear and front end walls, the rear angular wall positioned against the diverging wall of the seat pocket and the front angular wall forming a seat face, a frusto conical seat retainer having its small end positioned against the front end wall of the seat member, seat retaining lugs in wall of the chamber which contact the large end of the seat retainer, a rotatable valve member having an internal passage which in the open position of the valve registers with the inlet and outlet ports to form the run of the valve, generally spherical seating surfaces, the valve member along the axis of the passage being shorter than the distance along an axis through the spherical seating surfaces permitting the valve member when the passage is aligned with the inlet and outlet ports to be inserted into the valve chamber and when rotated to a closed position to contact the seats in a sealing condition whereby there is a slight interference between the seats, said valve member having a bearing, the bearing of the valve member journaled on the trunnion in the bottom wall of the chamber, the top of the valve member provided with a projection, an operating stem, one end of said stem provided with a slot cooperating with the projection of the valve member, the other end of said stem extending through the opening of the chamber, a bonnet closing the opening of the chamber, said bonnet having an opening through which the operating stem extends, the bonnet provided with bearing and the top of the valve member provided with a trunnion which is journaled in the bearing in the bonnet, and means establishiing a seal between the operating stem and opening in the bonnet.

5. A top entry ball valve comprising a valve body having two axially aligned fluid passages forming inlet and outlet ports and an open-top valve chamber interposed between said passages, said chamber including side walls, a bottom wall having a centrally located trunnion and end walls surrounding said passages, the distance between the side walls being greater than the distance between the end walls, a seat pocket in each end wall, each pocket formed of an annular side wall coaxial with the axis of the passages but of a greater diameter than the diameter of the passage and an outer wall intersecting the passage and diverging axially outward of the valve chamber to intersect with the annular side wall, an annular seat member formed of resilient material positioned in each seat pocket, each seat member having a cross sectional configuration generally defining a triangle with the base of the triangle forming a cylindrical wall contacting the annular wall of the pocket, the rear angular side of the triangle forming a rear angular wall positioned against the diverging wall of the pocket and the front angular side of the triangle forming a seat face extending into the valve chamber, a retainer having one end positioned against the seat face of the seat member and seat retaining lugs in wall of the chamber which contact the other end of the seat retainer, a rotatable valve member, said valve member having an internal passage which in the open position of the valve registers with the inlet and outlet ports to form the run of the valve and generally spherical seating surfaces positioned in the valve chamber, the valve member along the axis of the passage being shorter than the distance along an axis through the spherical seating surfaces permitting the valve member when the passage is aligned with the inlet and outlet ports to be inserted into the valve chamber and when rotated to a closed position to contact the seats in a sealing condition whereby there is a slight interference between the seats, said valve member having a bearing, the bearing of the valve member journaled on the trunnion in the bottom wall of the chamber, the top of the valve member provided with a projection, an operating stem, one end of said stem provided with a slot cooperating with the projection of the valve member, the other end of said stem extending through the opening of the chamber, a bonnet closing the opening of the chamber, said bonnet having an opening through which the operating stem extends.

6. A top entry ball valve comprising a valve body having two axially aligned fluid passages forming inlet and outlet ports and an open-top valve chamber interposed between said passages, said chamber including side walls, a bottom wall having a centrally located trunnion, and end walls surrounding said passages, the distance between the side walls being greater than the distance between the end walls, a seat pocket in each end wall, each pocket forming of an annular side wall coaxial with the axis of the passages but of a greater diameter than the diameter of the passage and an outer wall intersecting the passage and diverging axially outward of the valve chamber to intersect with the annular side wall, an annular seat member formed of resilient material positioned in each seat pocket, each seat member having a cross sectional configuration generally defining a triangle with the base of the triangle forming a cylindrical wall contacting the annular wall of the pocket, the rear angular side of the triangle forming a rear angular wall positioned against the diverging wall of the pocket and the front angular side of the triangle forming a valve seat face extending into the valve chamber, a rotatable valve member having an internal passage which in the open position of the valve registers with the inlet and outlet ports to form the run of the valve and generally spherical seating surfaces, the valve member along the axis of the passage being shorter than the distance along an axis through the spherical seating surface permitting the valve member when the passage is aligned with the inlet and outlet ports to be inserted into the valve chamber and when rotated to a closed position to contact the seats in a sealing condition whereby there is a slight interference between the seats, a pair of hollow frusto conical seat retainers, one placed over each end of the passage of the valve member and inserted with the valve member into the valve chamber, a bonnet closing the valve chamber, seat retainer lugs in the walls of the chamber and bonnet, each seat retainer positioned between the face of the seat member and seat retainer lugs to retain the seat member in position, the valve member having a bearing, the bearing of the valve member journaled over the trunnion in the chamber, an operating stem, the bonnet having an opening through which one end of the stem extends, means establishing a seal between the stem and opening, the other end of the stem cooperating with the valve member.

7. A top entry ball valve comprising a valve body having two axially aligned fluid passages forming inlet and outlet ports and an open-top valve chamber interposed between said passages, said chamber including side walls, a bottom wall and end walls surrounding said passages, the distance between the side walls being greater than the distance between the end walls, a seat pocket in each end wall, each pocket formed of an annular side wall coaxial with the axis of the passages but of a greater diameter than the diameter of the passage and an outer wall intersecting the passage and diverging axially outward of the valve chamber to intersect with the annular side wall, an annular seat member formed of resilient material positioned in each seat pocket, each seat member having a cross sectional configuration generally defining a triangle with the base of the triangle forming a cylindrical wall contacting the annular wall of the pocket, the rear angular side of the triangle forming a rear angular wall positioned against the diverging wall of the pocket and the front angular side of the triangle forming a front angular wall extending into the valve chamber, a portion of said front angular wall being a valve seat face, a rotatable valve member having an internal passage which in the open position of the valve registers with the inlet and outlet ports to form the run of the valve and generally spherical seating surfaces, the valve member along the axis of the passage being shorter than the distance along an axis through the spherical seating surface permitting the valve member when the passage is aligned with the inlet and outlet ports to be inserted into the valve chamber and when rotated to a closed position to contact the seats in a sealing condition whereby there is a slight interference between the seats, a pair of hollow frusto conical seat retainers, one placed over each end of the passage of the valve member and inserted with the valve member into the valve chamber, seat retainer lugs in the walls of the valve chamber, each seat retainer positioned between the face of the seat member and the lugs to retain the seat member in position, means securing the valve member against axial movement, an operating stem cooperating with the rotatable valve member, a bonnet closing the opening of the chamber, said bonnet having an opening through which the operating stem extends.

8. A top entry ball valve comprising a valve body having two axially aligned fluid passages forming inlet and outlet ports and an open-top valve chamber interposed between said passages, said chamber including side walls, a bottom wall and end walls surrounding said passages, the distance between the side walls being greater than the distance between the end walls, a seat pocket in each end wall, each pocket formed of an annular side wall coaxial with the axis of the passages but of a greater diameter than the diameter of the passage and an outer wall intersecting the passage and diverging axially outward of the valve chamber to intersect with the annular side wall, an annular seat member formed of resilient material positioned in each seat pocket, each seat member having a cross sectional configuration generally defining a triangle with the base of the triangle forming a cylindrical wall contacting the annular wall of the pocket, the rear angular side of the triangle forming a rear angular wall positioned against the diverging wall of the pocket and the front angular side of the triangle forming a front angular wall extending into the valve chamber, a portion of said front angular wall being a valve seat face, a rotatable valve member having an internal passage which in the open position of the valve registers with the inlet and outlet ports to form the run of the valve and generally spherical seating surfaces, the valve member along the axis of the passage being shorter than the distance along an axis through the spherical seating surface permitting the valve member when the passage is aligned with the inlet and outlet ports to be inserted into the valve chamber and when rotated to a closed position to contact the seats in a sealing condition, a pair of hollow frusto conical seat retainers, one placed over each end of the passage of the valve member and inserted with the valve member into the valve chamber, seat retainer lugs in the walls of the chamber, each seat retainer positioned between the face of the seat member and the lugs to retain the seat members in position, an operating stem cooperating with the rotatable valve member, a bonnet closing the opening of the chamber, said bonnet having an opening through which the operating stem extends.

9. A top entry ball valve comprising a valve body having two axially aligned fluid passages forming inlet and outlet ports and an open-top valve chamber interposed between said passages, said chamber including side walls, a bottom wall and end walls surrounding said passages, the distance between the side walls being greater than the distance between the end walls, a seat pocket in each end wall, an annular seat member formed of resilient material positioned in each seat pocket, each seat member having a face extending into the valve chamber, a portion of said face being the valve seat face, a rotatable valve member having an internal passage which in the open position of the valve registers with the inlet and outlet ports to form the run of the valve and generally spherical seating surfaces, the valve member along the axis of the passage being shorter than the distance along an axis through the spherical seating surface permitting the valve member when the passage is aligned with the inlet and outlet ports to be inserted into the valve chamber and when rotated to a closed position to contact the seats in a sealing condition, a pair of hollow frusto conical seat retainers, one placed over each end of the passage of the valve member and inserted with the valve member into the valve chamber, seat retainer lugs in the walls of said chamber, each seat retainer positioned between the face of the seat member and the lugs to retain the seat members in position, an operating stem cooperating with the rotatable valve member, a bonnet closing the opening of the chamber, said bonnet having an opening through which the operating stem extends.

10. A top entry ball valve comprising a valve body having two axially aligned fluid passages forming inlet and outlet ports and an open-top valve chamber interposed between said passages, said chamber including end walls surrounding said passages, a seat pocket in each end wall, an annular seat member formed of resilient material positioned in each seat pocket, each seat member having a face extending into the valve chamber, a rotatable valve member having an internal passage which in the open position of the valve registers with the inlet and outlet ports to form the run of the valve and generally spherical seating surfaces, pair of seat retainers, one placed over each end of the passage of the valve member and inserted with the valve member into the valve chamber, seat retainer lugs in the walls of the valve chamber, each seat retainer positioned between the face of the seat member and the lugs to retain the seat member in position, an operating stem cooperating with the rotatable valve member, a bonnet closing the opening of the chamber, said bonnet having an opening through which the operating stem extends, and means to seal between the stem and opening.

11. A ball valve comprising a valve body having two axially aligned fluid passages forming inlet and outlet ports and a valve chamber interposed between said passages, said chamber including a bottom wall, end walls surrounding said passages, a seat pocket in each end wall, each pocket being formed of an annular side wall coaxial with the axis of the passages but of a greater diameter than the diameter of the passage, a diverging wall intersecting the passage and diverging axially outward of the valve chamber to intersect the annular wall, an annular seat member formed of resilient plastic material positioned in each seat pocket, each seat member having a face extending into the valve chamber a portion of said face being the valve seat face, a rotatable valve member having an internal passage which in the open position of the valve registers with the inlet and outlet ports to form the run of the valve and generally spherical seating surfaces, a pair of seat retainers, one being positioned between an end of the valve member and seat member, seat retainer lugs on the walls of the valve chamber, one end of the seat retainer positioned adjacent the face of the seat member the other end of the retainer positioned adjacent the seat retaining lugs permitting the seat member to move a controlled amount in response to line pressure to effect a seal but prohibiting movement into the chamber whereby it would be cut during operation of the valve, an operating stem, an opening through which the operating stem extends, and means to establish a seal between the operating stem and opening in the bonnet.

12. A ball valve comprising a valve body having two axially aligned fluid passages forming inlet and outlet ports and a valve chamber interposed between said passages, said chamber defined by end walls surrounding said passages, a seat pocket in each end wall, an annular seat member formed of resilient material positioned in each seat pocket, each seat member having a face extending into the valve chamber, a rotatable valve member having an internal passage which in the open position of the valve registers with the inlet and outlet ports to form the run of the valve and generally spherical seating surfaces, the valve member positioned in the chamber, hollow frusto conical seat retainers placed over each end of the passage of the valve member, seat retainer lugs in the walls of the valve chamber, each seat retainer positioned between the face of the seat member and its respective seat retainer lug to retain the seat member in position permitting only limited movement of the seat member toward the valve member for pressure actuation of the seat member, an operating stem cooperating with the rotatable valve member.

13. A ball valve comprising a valve body having two axially aligned fluid passages forming inlet and outlet ports and a valve chamber interposed between said passages, said chamber defined by end walls surrounding said passages, a rotatable valve member having an internal passage which in the open position of the valve registers with the inlet and outlet ports to form the run of the valve and generally spherical seating surfaces, the valve member positioned in the chamber, an annular seat member formed of resilient material positioned between the valve member and each end wall of the valve chamber, hollow frusto conical seat retainers placed over each end of the passage of the valve member, seat retainer lugs in the walls of the valve chamber, each seat retainer positioned between the face of the seat member and its respective seat retainer lug to retain the seat member in position permitting only limited movement of the seat member toward the valve member for pressure actuation of the seat member, an operating stem cooperating with the rotatable valve member.

References Cited in the file of this patent

UNITED STATES PATENTS

| | | |
|---|---|---|
| 2,839,074 | Kaiser | June 17, 1958 |
| 2,861,773 | Clade | Nov. 25, 1958 |
| 2,883,146 | Knox | Apr. 21, 1959 |
| 2,940,725 | Nagel | June 14, 1960 |

FOREIGN PATENTS

| | | |
|---|---|---|
| 460,042 | Great Britain | Jan. 20, 1937 |